March 2, 1948.  J. DUNLOP  2,436,798
GEAR MECHANISM
Filed Dec. 16, 1943  3 Sheets-Sheet 1

WITNESSES:

INVENTOR
James Dunlop.
BY
ATTORNEY

March 2, 1948.　　　J. DUNLOP　　　2,436,798
GEAR MECHANISM
Filed Dec. 16, 1943　　　3 Sheets-Sheet 2

WITNESSES:

INVENTOR
James Dunlop.
ATTORNEY

March 2, 1948.  J. DUNLOP  2,436,798
GEAR MECHANISM
Filed Dec. 16, 1943  3 Sheets-Sheet 3

WITNESSES:

INVENTOR
James Dunlop.
BY
ATTORNEY

Patented Mar. 2, 1948

2,436,798

UNITED STATES PATENT OFFICE 2,436,798

GEAR MECHANISM

James Dunlop, Ridgewood, N. J., assignor, by mesne assignments, to Westinghouse Electric Corporation, East Pittsburgh, Pa., a corporation of Pennsylvania Application December 16, 1943, Serial No. 514,519

5 Claims. (Cl. 64—27)

My invention relates to gear mechanisms, and, more partciularly, to resilient and slidable gear connections for use between a driving shaft and a driven shaft.

One object of my invention is to provide a resilient slidable gear connector for use between a power driving mechanism and a driven mechanism which will absorb any sudden shocks which may be caused to either mechanism by the sudden stopping of the other mechanism.

Another object is to provide a resilient mounting for a gear connection between a power shaft and a driven shaft which will permit a limited and restrained rotation of either shaft with reference to the other shaft.

A further object is to provide a gear connection between a motor driven shaft and a shaft to be driven thereby which will permit stopping the motor while the driven shaft continues in motion.

A still further object is to provide a resilient gear connection between a pair of shafts which will not only permit a limited and restrained relative rotation of the shafts but will also permit relative axial movement of the shafts.

It is also an object of my invention to provide a resilient gear connector which shall be simple and inexpensive to manufacture and install and which shall be effective under all conditions of service without requiring frequent renewal of the parts.

The invention is illustrated in the accompanying drawings; in which.

The invention is illustrated as applied to the valve operating mechanism of a hydraulic engine such as may be used for operating the hoisting cables of an elevator. However, it is to be understood that the invention may be used in many other instances where a resilient slidable gear connection with a shaft is desired.

Figure 1:
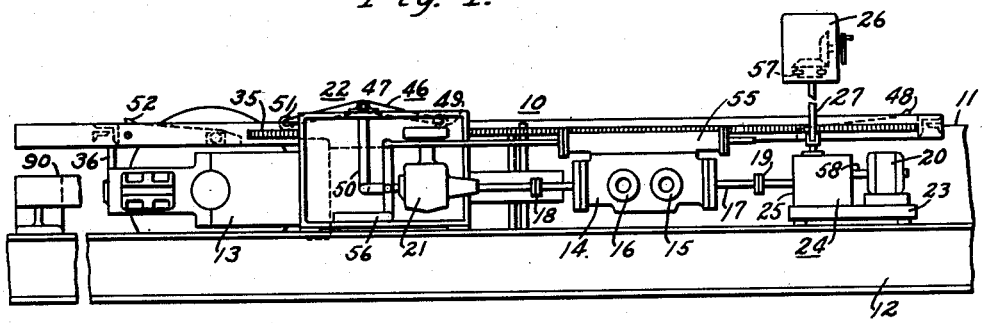
Figure 1 is a view in side elevation of a hydraulic engine and valve control therefor embodying my invention.
Figure 2:
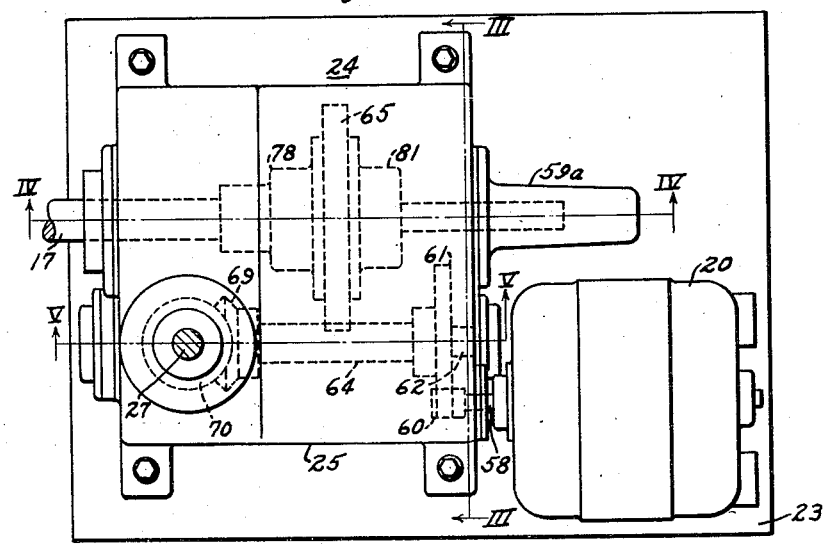
Fig. 2 is an enlarged top plan view of my improved gear mechanism for connecting a driving motor to the valve apparatus.
Figure 3:
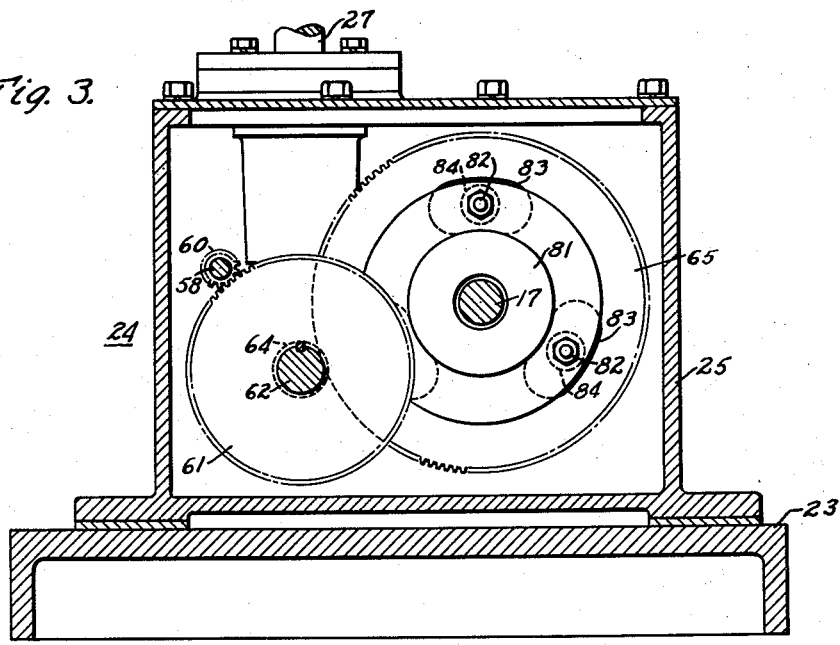
Fig. 3 is a view taken on the line III—III of Fig. 2.
Figure 4:
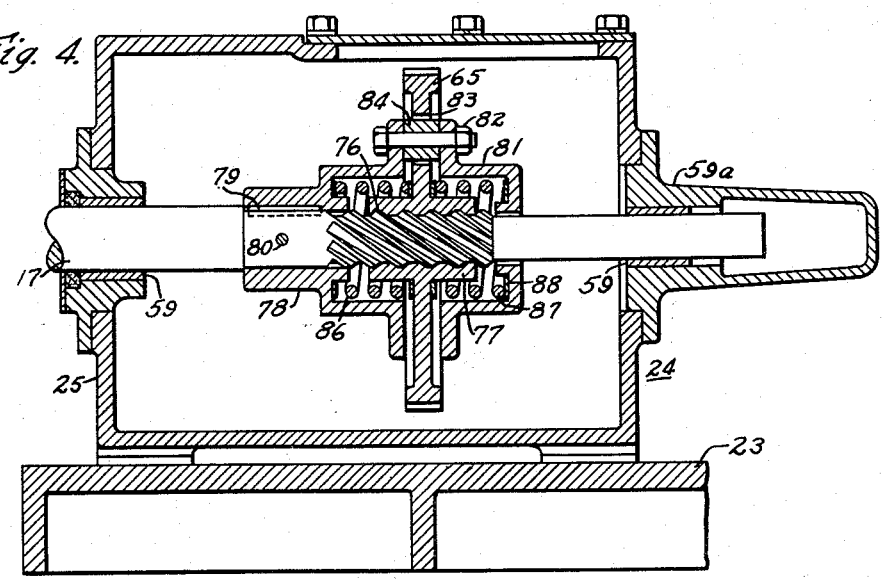
Fig. 4 is a view taken on the line IV—IV of Fig. 2.
Figure 5:
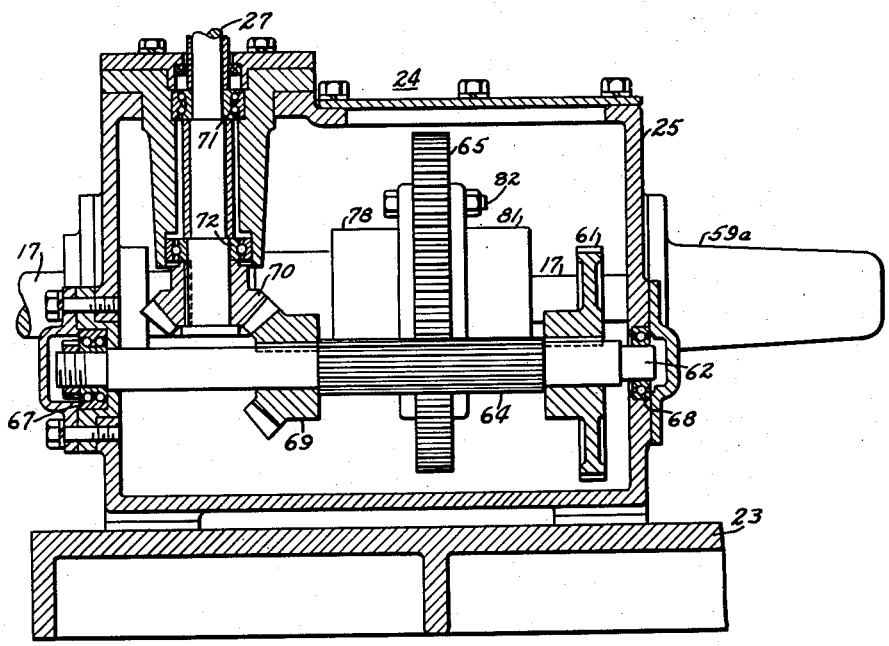
Fig. 5 is a view taken on the line V—V of Fig. 2.

Referring more particularly to Fig. 1, I have illustrated a hydraulic engine 10 comprising a cylinder 11 mounted on an engine bed 12 and a plunger 13 slidably disposed in the cylinder in position to be operated by any suitable hydraulic medium such as oil under pressure.

The input and output of the hydraulic medium for operating the plunger is controlled by a valve block 14 having an inlet port 15 and an exhaust port 16 and a valve shaft 17 for controlling their connection with the engine cylinder. The valve shaft 17 is provided with a piston type valve (not shown) for controlling the ports in such manner that the valve will be in its central position when both ports are closed and will be moved to either the right or the left to connect the engine cylinder with either the inlet port or the exhaust port.

An electric motor 20 and a differential mechanism 21 are provided for moving the valve shaft 17 from its closed position to open either the exhaust port or the inlet port in starting the operation of the plunger. A cam mechanism 22 operated by the plunger as it nears the end of its stroke acts as the valve closing mechanism. If the plunger is to be stopped by an emergency stop while in midway position, the motor is de-energized and the action of the plunger through the differential slows down to the plunger and stops it in a short distance. The shaft 17 is divided into several sections connected by universal joints 18 and 19 so that it may be easily alined with its bearings.

The motor 20 may be any suitable constant speed motor seated on a supporting base 23 mounted on the engine frame 12 and connected to the shaft 17 by my improved resilient and slidable reducing gear mechanism 24 disposed in a casing 25.

Figure 6:
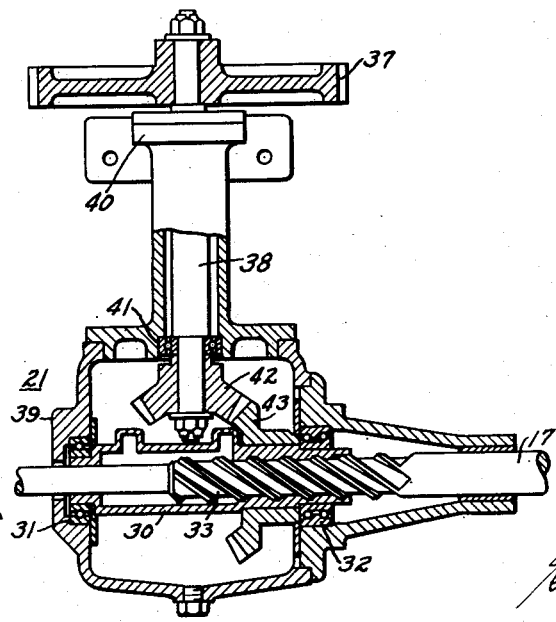
Fig. 6 is a sectional view in side elevation of the differential mechanism between the valve apparatus and the plunger of the engine.

A hand driven mechanism 26 is also connected to the reducing gear mechanism 24 by a shaft 27 so that the shaft 17 may be operated by a manual means instead of by the electric drive, when desired. The motor 20 rotates the shaft 17 in an internally screw threaded nut 30 (Fig. 6) rotatably mounted in the differential 21 by a pair of ball bearings 31 and 32. The bearings permit free rotation of the nut 30 but prevent any axial movement thereof. When the nut 30 is prevented from rotation and the shaft 17 is rotated by the motor 20, the screw threaded connection 33 between the shaft and the nut causes axial movement of the shaft 17 to control the opening of the inlet and exhaust ports. The connection 33 is a coarse threaded screw having a high helix angle so that it will not be self-locking but will be a free running screw so that the shaft may be moved axially by the application of an axial force or it may be moved axially by rotation of either the nut or the shaft.

The rotative condition of the nut 30 is controlled by the operative condition of the plunger by means of a gear rack 35 which is movably supported on the engine frame and connected by an arm 36 with the plunger so that the rack moves back and forth with the plunger.

The gear rack 35 is positioned to engage and operate a gear wheel 37 fixed on the upper end of a shaft 38 which is rotatably mounted in the differential casing 39 by a pair of ball bearings 40 and 41. A beveled gear wheel 42 is fixed on the lower end of the shaft 38 in position to engage a cooperating beveled gear wheel 43 fixed on the rotatable nut 30, so that the nut 30 will stand still when the plunger is standing still but will be rotated by the movement of the plunger when the plunger moves. Hence, the differential 21 effects an axial movement of the valve shaft 17 which is proportionate to the rotation of the shaft 17 by the motor and the movement of the plunger which will cause the plunger to start, accelerate to a desired speed and then maintain that speed when the motor is energized to cause the valve to open.

The cam mechanism 22 for closing the valve at the end of either stroke of the engine comprises a rocker arm 46 pivotally mounted at its central portion on the engine frame by a pair of bearings 47. The one end of the rocker arm is disposed to be controlled by a cam 48 which is mounted on the gear rack 35 in position to engage the rocker arm end 49 as the plunger completes its forward stroke and thereby operate the rocker arm 46 to move its depending arm 50 in counterclockwise direction and thereby push the valve shaft 17 to its closed position.

The other end 51 of the rocker arm is disposed to be controlled by a cam 52 mounted on the gear rack 35 in position to engage the arm 51 and raise it as the plunger approaches the end of its rearward stroke. This operation of the rocker arm in clockwise direction moves its depending arm 50 to pull the shaft 17 to valve closed position.

A vernier valve 55 is also mounted in the valve block 14 in position to be operated by a link and lever connection 56 with the valve shaft 17 so that it will be closed and opened with the main valve operated by the shaft 17.

A brake 57 is mounted on the shaft 27 in the handle control station for stopping the rotation of the shaft 27 and the motor shaft 58 which are connected in the gear reducing mechanism 25. The brake 57 may be in the usual electro-mechanical brake designed to be applied to prevent rotation of the motor or the hand drive shaft whenever the motor is deenergized. However, a brake releasing device (not shown) is connected to the brake and the hand device so that the brake will be released whenever the hand device is to be operated.

Referring to Figs. 2, 3, 4 and 5, the motor end of the shaft is rotatably and slidably supported in the gear mechanism casing 25 by a pair of suitable sleeve bearings 59. A cap 59a is mounted on the side of the casing to protect the end of the shaft.

The motor 20 is connected to the shaft 17 by a gear train comprising a pinion 60 mounted on the motor shaft 58 in position to engage a gear wheel 61 mounted on a stub shaft 62 and a gear pinion 64 mounted on the stub shaft in position to mesh with a gear wheel 65 mounted on the shaft 17. The face of the pinion 64 is much wider than the face of the gear wheel 65 so that the gear wheel 65 may slide axially along the pinion 64 while remaining in mesh with it, thus permitting the shaft 17 to be moved axially with relation to the shaft 62 in a valve operating action.

The stub shaft 62 is rotatably mounted in the gear casing 25 by a pair of ball bearings 67 and 68, and, in addition to the pinion 64, is provided with a beveled gear wheel 69 disposed to be engaged by a cooperating beveled gear 70 fixed on the lower end of the hand operating shaft 27 which is rotatably mounted in the casing 25 by a suitable pair of ball bearings 71 and 72. Hence it will be apparent that the shaft 62 may be rotated for operating the shaft 17 by either the motor 20 or the hand device 26.

The valve operating mechanism for the engine has been described and claimed in my copending application Serial No. 515,992, filed December 28, 1943 now Patent No. 2,409,198, issued October 15, 1946, and more detailed information relating to the valve mechanism may be obtained therefrom, if desired.

When the engine plunger comes within very close distance, say one-half inch, of the end of its forward or rear stroke, the motor 20 is deenergized. This action applies the brake 57 which prevents further rotation of the hand drive shaft 27, the stub shaft 62 and the motor shaft 58. Therefore, the final valve closing movement of the cam and rocker arm mechanism pushes or pulls the shaft 17 through the differential nut 30 thus causing not only axial movement of the shaft 17 but also a slight rotative movement due to the anti-selflocking screw threaded connection between the shaft and the nut. In order to permit this slight rotation of the shaft 17 after the brake has stopped the motor shaft and the hand drive shaft, I have provided a novel connection for mounting the gear wheel 65 on the shaft 17.

The gear wheel 65 (Fig. 4) is rotatably mounted on the shaft 17 by means of a high helix angle screw threaded connection 76 with the shaft, so that relative rotation of the shaft and the gear wheel will move the gear wheel axially on the shaft in one direction or the other, depending upon the direction of rotation. This screw thread may also be called a free running screw thread because the shaft can be pushed or pulled through the gear wheel by the application of an axial force.

A cup-shaped cylindrical collar 78 is mounted on the shaft at one side of and facing the gear wheel. This collar is fixed on the shaft by a key 79 and a pin 80 which cause it to rotate with the shaft and prevent its axial movement thereon. A cooperating cup-shaped cylindrical collar 81 is mounted on the shaft at the other side of and facing the gear wheel. The collars are securely fastened together by a plurality of bolts 82 which pass through cooperating slots 83 in the web of the gear wheel. A plurality of spacing cylinders 84 are mounted on the bolts where they pass through the slots in the gear wheel. The length of the spacing cylinders should be so selected as to separate the collars sufficiently to permit a predetermined sideway movement of the gear wheel. The diameter of the spacing cylinders and the length of the slots (approximately 30°)

in the gear wheel will limit the relative rotation of the gear wheel and the shaft to the amount for which the apparatus is designed.

A heavy helical compression spring 86 is mounted on the shaft between the one side of the gear wheel and the collar 78, and a similar heavy helical compression spring 87 is mounted on the shaft between the other side of the gear wheel and the collar 81. The springs should be of equal strength and mounted in the same manner so that they will normally bias the gear wheel to its central position between the collars. The biasing effect of the springs may be adjusted by increasing or decreasing the number of washers 88 at the ends of the springs. The use of the adjusting washers is particularly advantageous, because it permits the parts to be made in standard designs which may be readily applied to meet various conditions of service merely by increasing or decreasing the number of washers.

From this construction, it will be apparent that if a relative movement of the shaft and the gear wheel occurs, the screw threaded connection of the hub 77 of the gear wheel with the shaft will screw the gear wheel to one side and thereby compress the biasing spring on that side of the gear wheel. The energy absorbed in this compression of the biasing spring will retard the relative rotation of the shaft and the gear wheel and, at the same time, will store up a biasing energy which will tend to return the gear wheel to its normal position on the shaft midway between the two collars when the cause of the relative rotation ceases or is relieved.

*Assumed operation of the apparatus*

It will be assumed now that the hydraulic engine is placed in use by energizing the motor 20 for operating the valve shaft 17. The energized motor rotates its pinion 60 which in turn rotates the gear wheel 61, the pinion 64, the gear wheel 65 and the shaft 17. Inasmuch as this is a slow starting movement, it is not sufficient to overcome the strength of the biasing springs 86 and 87 and, therefore, the motor rotates the shaft 17 at its predetermined reduced rate of rotation. However, when the motor starts from rest, the compression of the spring during the first several turns of the motor cushions the load of the inertia of the moving parts so that the motor comes up to speed faster than it would if the total inertia load were connected from standstill.

The rotation of the shaft 17 screws it into the nut 30 in the differential which causes the valve shaft to move axially to open the valve for moving the plunger. As the plunger starts, it moves the gear rack 35 and thereby rotates the gear wheel 37, the shaft 38, the gear wheels 42 and 43, and the nut 30. As the nut 30 starts rotating, it slows down the axial movement of the shaft 17, and, when the plunger reaches the speed for which the engine is designed, the nut 30 and the shaft 17 will rotate at the same speed, thus stopping further axial movement of the shaft, so that the plunger now moves at its predetermined speed.

As the plunger approaches the end of its forward stroke it moves the cam 48 into engagement with the cam device 49 and thereby raises the rocker arm to move its depending arm 50 in counterclockwise direction. This movement of the arm 50 slowly forces the valve shaft 17 to the right, thus decelerating the speed of the plunger.

As the plunger arrives within one-half inch of its stopping blocks 90, the motor 20 is deenergized, thus applying the brake 57 and stopping the rotation of the hand-drive shaft 27, the shaft 62 and the motor shaft 58. This action also stops the gear wheel 65 by reason of its engagement with the pinion 64 on the stub shaft 62. However, the plunger continues its movement towards its stopping block 90 and thereby continues moving the rocker arm 46 and its arm 50 to valve closing position. The valve closing movement of the arm 50 continues to push the valve shaft 17 to its closing position through the screw threaded nut 30 in the differential, thus causing a slight rotation of the shaft 17 although the gear wheel 65 thereon is locked against rotation by the pinion 64.

However, it will be seen that, although the gear wheel 65 is prevented from rotating by the brake, a continued axial movement and rotation of the shaft 17 in the gear wheel will be permitted by reason of the screw threaded connection 76 permitting a limited relative rotation between the gear wheel and the shaft. This movement is opposed by a compression spring but not sufficiently to overcome the force exerted by the cam and rocker arm. However, the compression of the spring does provide a buffer or biasing effect against the movement. The movement of the gear wheel 65 against the spring will also store up energy which will return the gear wheel to its normal central position when the stress on the parts is relieved.

It will be apparent that if the motor is driving the valve shaft 17 and is suddenly stopped for any reason, the limited resilient movement of the gear wheel 65 on the shaft 17 will permit the stopping of the motor to occur without a damaging shock between it and the shaft 17, because the energy released by the sudden stop will be absorbed by one of the compression springs in the gear wheel connection with the shaft 17.

From the foregoing description of the apparatus it will be evident that I have provided a resilient connector for a gear mechanism which will absorb any sudden shocks involved in the stopping of either end of the gear train and which will also permit a limited axial and rotative movement of the shaft on which the gear wheel is mounted.

Although I have illustrated and described only one specific embodiment of my invention, it is to be understood that changes therein and modifications thereof may be made without departing from the spirit and scope of the invention.

I claim as my invention:

1. In a gear mechanism, a shaft, a gear wheel rotatably mounted on the shaft by a high helical angle screw thread, said gear wheel having a plurality of slots in its web, a pair of collars mounted on the shaft, one on each side of the gear wheel and spaced a predetermined distance therefrom, a plurality of bolts disposed through the collars and the slots in the gear wheel for limiting the relative rotative motion between the gear wheel and the shaft, means for fixing the collars on the shaft, and springs disposed between the collars and the gear wheel for biasing the gear wheel to a position midway between the collars.

2. In a gear mechanism, a shaft having, a high helical angle screw threaded section, a gear wheel provided with a plurality of slots in its web and having an internal high helical angle screw threaded hub for engaging the screw threaded section of the shaft, a collar fixed on the shaft with its open end facing the gear wheel, a second collar disposed on the shaft at the other side of the gear wheel, a plurality of bolts passing through the slots in the web of the gear wheel and connected to the collars for holding the second collar in a fixed relation to the first named collar, and for limiting the relative rotative movement of the gear wheel and the shaft, a helical spring mounted on the shaft between the first named collar and the gear wheel, a second helical spring mounted on the shaft between the second named collar and the gear wheel, said springs mounted under compression for biasing the gear wheel to a midway position between the collars, and a plurality of washers disposed at the ends of the springs for adjusting their biasing effect.

3. In a gear mechanism, a shaft having, a high helical angle screw threaded section, a gear wheel provided with a plurality of slots in its web and having an internal high helical angle screw threaded hub for engaging the screw threaded section of the shaft, a collar fixed on the shaft at one side of the gear wheel, a second collar disposed on the shaft at the other side of the gear wheel, a plurality of bolts connecting the collars and passing through the slots in the web of the gear wheel for limiting the relative rotative motion of the gear wheel and the shaft, a helical spring mounted on the shaft between the first named collar and the gear wheel, and a second helical spring mounted on the shaft between the second named collar and the gear wheel, said springs being mounted under compression for biasing the gear wheel to a midway position between the collars.

4. In a gear mechanism, a shaft having, a high helical angle screw threaded section, a gear wheel provided with a plurality of slots in its web and having an internal high helical angle screw threaded hub for engaging the screw threaded section of the shaft, a cup shaped collar fixed on the shaft with its open end facing the gear wheel, a second cup shaped collar disposed on the shaft at the other side of the gear wheel, a plurality of bolts passing through the slots in the web of the gear wheel and connected to the collars for holding the second collar in a fixed relation to the first named collar, and for limiting the relative rotative motion of the gear wheel and the shaft, a spacing cylinder disposed on each bolt between the collars for holding the collars a predetermined distance from the gear wheel when it is in its normal axial position on the shaft, a helical spring mounted on the shaft between the first named collar and the gear wheel, and a second helical spring mounted on the shaft between the second named collar and the gear wheel, said springs being mounted under compression for biasing the gear wheel to a midway position between the collars.

5. In a gear mechanism, a shaft having, a high helical angle screw threaded section, a gear wheel provided with a plurality of slots in its web and having an internal high helical angle screw threaded hub for engaging the screw threaded section of the shaft, a cup shaped collar fixed on the shaft with its open end facing the gear wheel, a second cup shaped collar disposed on the shaft at the other side of the gear wheel, a plurality of bolts passing through the slots in the web of the gear wheel and connected to the collars for holding the second collar in a fixed relation to the first named collar and for limiting the relative rotative motion of the gear wheel and the shaft, a spacing cylinder disposed on each bolt between the collars for holding the collars a predetermined distance from the gear wheel when it is in its normal axial position on the shaft, a helical spring mounted on the shaft between the first named collar and the gear wheel, a second helical spring mounted on the shaft between the second named collar and the gear wheel, said springs being of approximately equal strength and mounted under compression for biasing the gear wheel to a midway position between the collars, and a plurality of washers disposed at the ends of the springs for adjusting their biasing effect.

JAMES DUNLOP.

REFERENCES CITED

The following references are of record in the file of this patent:

UNITED STATES PATENTS

| Number | Name | Date |
| --- | --- | --- |
| 2,127,996 | Havill | Aug. 23, 1938 |
| 431,811 | Johnson | July 8, 1890 |
| 1,321,512 | Eaton | Nov. 11, 1919 |
| 1,349,082 | Middleton | Aug. 10, 1920 |
| 1,974,784 | Pilcher | Sept. 25, 1934 |
| 1,966,246 | Jackson | July 10, 1934 |
| 1,165,381 | Anderson | Dec. 28, 1915 |